Figure 1:
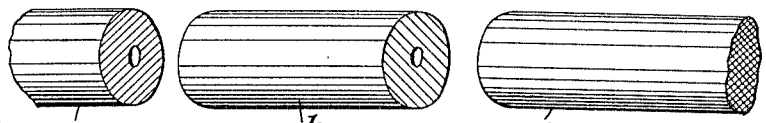

D. MAGGIORA.
SOLID TIRE FOR VEHICLES AND THE LIKE.
APPLICATION FILED JUNE 29, 1912.

1,084,866.

Patented Jan. 20, 1914.

Witnesses
John H. Hoving
Richard R. Appleton

Inventor
Demetrio Maggiora
By O. H. Berrigan
Attorney

UNITED STATES PATENT OFFICE.

DEMETRIO MAGGIORA, OF LONDON, ENGLAND.

SOLID TIRE FOR VEHICLES AND THE LIKE.

1,084,866.

Specification of Letters Patent.

Patented Jan. 20, 1914.

Application filed June 29, 1912. Serial No. 706,667.

*To all whom it may concern:*

Be it known that I, DEMETRIO MAGGIORA, a citizen of the Kingdom of Italy, and resident of 153 Warwick street, Belgravia, London, England, have invented certain new and useful Improvements in Solid Tires for Vehicles and the like, of which the following is a specification, such as will enable others skilled in the art to which it appertains to make and use the same.

This invention relates to an improved elastic tire for the wheels of vehicles, of the class in which india rubber under permanent strain is employed, the invention consisting in both the improved tire and the method of making same.

In carrying out my invention I employ india rubber of good quality or a suitable substitute therefor, or any convenient combination of such materials, and my tire may be broadly described as consisting of a core, solid or otherwise, and preferably of highly resilient material around which one or more tubes of rubber or other highly resilient material are expanded so as to be in a state of very considerable tension. These tubes may be in segments or not, as desired, but are already in the form of a tube before they are expanded over the core. My improved tire is thus differentiated from that type of tire in which a core has rubber under tension wound around it, and also from that type in which an elastic tube has elastic material in a fluid state pumped into it, the said material setting after it is in the tube.

As an example, a tire made according to my invention and suitable for a motor car, may comprise a core of solid india rubber which under normal conditions has a diameter of say two inches, and over which a tube of india rubber having normal diameters of say one and five eighths of an inch outside and five eighths of an inch inside is expanded, a second tube of the same size being put over the first and a third of the same size being put over the second with the obvious result that the first tube will be expanded and at the same time will exert pressure upon and compress the core the second tube will also be expanded to a greater extent than the first and exert great pressure upon the first tube and the core, while the third tube will be expanded still more than the second and will exert a still greater pressure upon the second tube, the first tube and also the core, resulting in a cylindrical body of rubber in which an enormous amount of energy is stored with the result that the said body is extremely resilient.

The method of placing the tubes over the core or over each other may vary as required and the body formed may be of any convenient length and as previously stated, may be in segments and obviously the tubes may be of different measurements if desired, but must be of dimensions and in such a state of tension as to store up a large amount of energy which necessarily varies according to the class of tire and its object. This body forms the main part of the tire and may be fitted with any suitable cover or tread and provided with any desired means for attaching to the wheels of the vehicles.

I will now describe my invention with reference to the accompanying drawings, in which:—

Figure 2:
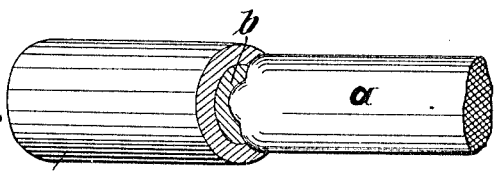
Figure 3:
Figure 4:
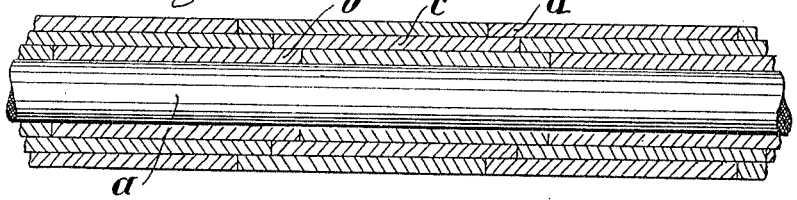
Figure 5:
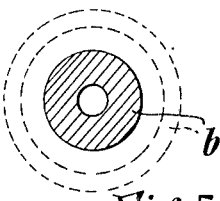
Figure 6:
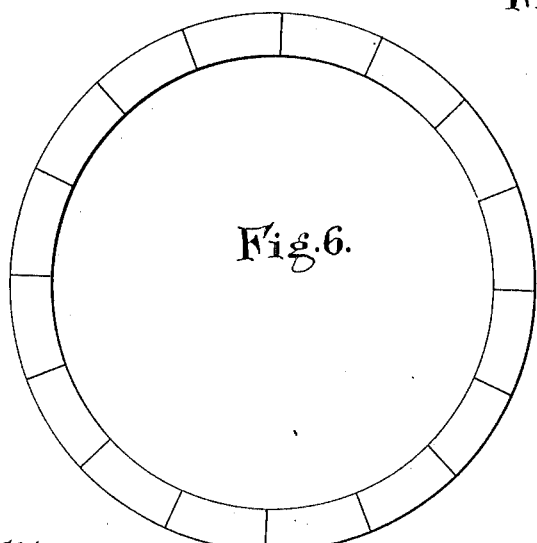

Figure 1 shows parts of the three main elements of a tire, a core $a$, a tubular segment $b$ and a second tubular segment $c$. Fig. 2 shows these three parts assembled, the tube $b$ having been placed over the core $a$ and the tube $c$ over the tube $b$ with the result that the core is greatly compressed and the tubes expanded. Fig. 3 is a sectional view of part of a tire showing a core $a$ with three tubes $b$, $c$, $d$, arranged around it, and said tubes being in segments and arranged in step-like manner. Fig. 4 shows part of a tire with tubes $b$ and $c$ in section and illustrates the compression of the core $a$. Figs. 3 and 4 are somewhat exaggerated. Fig. 5 shows the tube $b$ in full lines before stretching and in dotted lines twice stretched, while Fig. 6 shows a tire formed according to my invention, the ends being joined together in any convenient manner; or they may simply butt against each other without being fastened if inside a cover.

The tire may consist of two or more segments of core held together by the outer tread or cover. Any suitable form of and any convenient means of fixing may be employed.

If it is desired to use a lubricant such as rubber solution or glycerin between the parts for the purpose of facilitating the movement of one upon the other in arranging the said parts or the manipulation of the tubes employed, the said lubricant may be used but I wish it to be clearly understood that any suitable means may be employed for stretching the tubes over the core or over each other and the tire must not be confused with that tire in which energy is obtained by winding a strip of rubber over itself, or a core.

I claim—

1. An elastic tire comprising an elastic core having a series of short tubes expanded and imposed thereon throughout the length of the core and a plurality of series of short tubes expanded and superimposed in layers so that the outer series of tubes compress the inner series of tubes and the said core, the ends of the tubes in any layer being in staggered relation to those in adjacent layers.

2. An elastic tire comprising a solid elastic core having a seamless tube expanded and imposed thereon throughout the length of the core so that the core is compressed by the tube and the tube is tensioned by the core.

3. An elastic tire comprising a solid elastic core having a plurality of seamless tubes expanded and imposed thereon one tube over the other throughout the length of the core so that the tubes compress the core and are themselves tensioned by the core.

In witness whereof I have hereunto set my hand in presence of two witnesses.

DEMETRIO MAGGIORA.

Witnesses:
 HENRY FAIRBROTHER,
 WALTER CHOWLES.

Copies of this patent may be obtained for five cents each, by addressing the "Commissioner of Patents, Washington, D. C."